A. W. HALBERT,

Assignor, by mesne assignments, to A. SCHENCK.

Sewing-Machine.

No. 8,899. Reissued Sept. 16, 1879.

Witnesses.

W. E. Whitney

J. F. Cronin

Inventor.

Allen Schenck

Assignee A. W. Halbert by Crosby & Gregory Attys

THE NORRIS PETERS CO., PHOTO-LITHO., WASHINGTON, D. C.

UNITED STATES PATENT OFFICE.

ALLEN SCHENCK, OF NEW YORK, N. Y., ASSIGNEE, BY MESNE ASSIGNMENTS, OF A. W. HALBERT.

IMPROVEMENT IN SEWING-MACHINES.

Specification forming part of Letters Patent No. 76,076, dated March 31, 1868; Reissue No. 8,899, dated September 16, 1879; application filed August 2, 1879.

*To all whom it may concern:*

Be it known that A. W. HALBERT, of Taylor, in the county of Cortland and State of New York, invented a new and useful Improvement in Sewing-Machines, of which the following is a full, clear, and exact description, which will enable those skilled in the art to make and use the same, reference being had to the accompanying drawings, forming part of this specification, in which—

Figure 1:
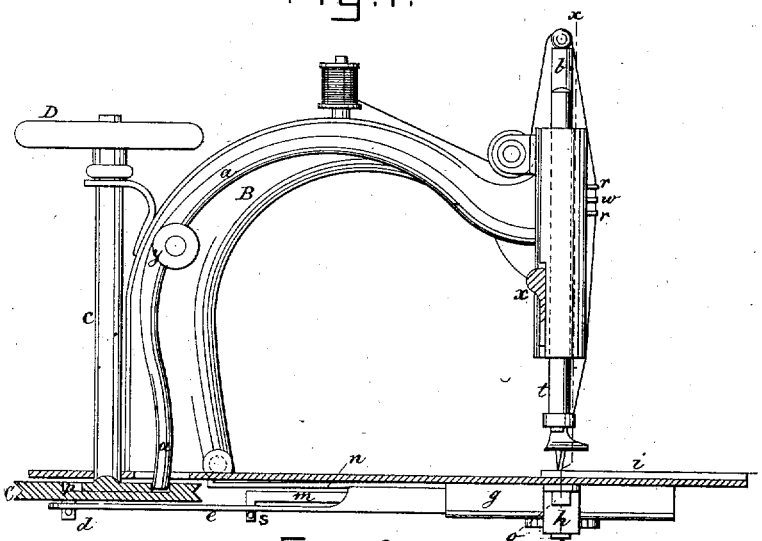
Figure 3:
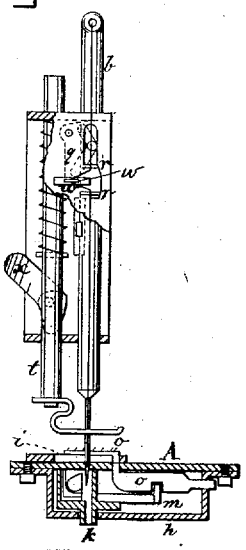
Figure 2:
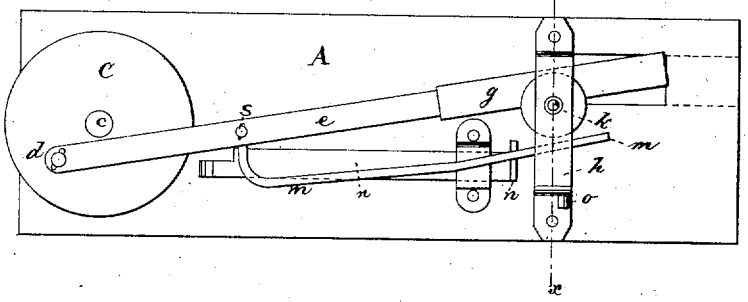
Figure 4:
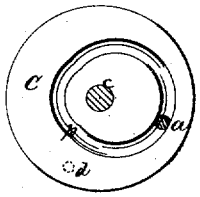
Figure 5:
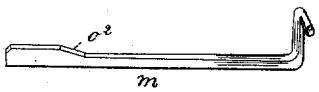

Figure 1 is a side view of the working parts of a sewing-machine containing this invention, some of the parts being in section. Fig. 2 is an under-side view of the same. Fig. 3 is a vertical section thereof on the line *x x*, Figs. 1 and 2. Fig. 4 is a detached view of the driving-wheel, showing the eccentric groove therein for giving motion to the needle-bar; and Fig. 5, a side view of the feed-lever detached.

Similar letters of reference indicate corresponding parts.

This invention relates to improvements in the construction of sewing-machines; and consists in the construction and arrangement of the mechanism whereby the working parts are much simplified and movement is given to them all by one wheel directly connected with the needle-bar; also, to the shuttle-carrier and the connected feed-lever to operate the feed-plate, as hereinafter more particularly described.

A represents the bed-plate, on which is fastened the curved arm B, for supporting the head of the machine, and the curved lever *a*, having its fulcrum at *y*, and giving motion to the needle-bar *b*. At the under side of the bed-plate A, at its rear end, is a horizontal driving wheel or disk, C, connected with a vertical shaft or spindle, *c*, supported in bearings back of the arm B, and provided with a hand-wheel, D. A wrist or pin, *d*, on the under side of the wheel C connects it with the shuttle-carrier *e*, that at its outer end carries the shuttle, and reciprocates it in a guide-box or race, *g*, which is pivoted under a strap or stirrup, *h*, so as to oscillate freely by means of the crank-action of the wheel C on the shuttle-carrier *e* as it is moved back and forth in the guide-box *g* while the latter oscillates.

The wheel C is to be moved by a friction-wheel bearing upon its periphery, packed with a rubber ring, or in any suitable way.

The pivot *k*, on which the shuttle-guide box *g* oscillates, is made tubular. It is placed on one side of the box, and the tube opens into it and runs through the bed-plate A, as shown clearly in Fig. 3, for the purpose of allowing the needle to enter and present its loop to the shuttle within the guide-box *g*. The shuttle-guide box *g* is covered by a slide, *i*, on the bed-plate A, which slide is moved outward to introduce the shuttle.

The shuttle-carrier *e* has a feed-lever, *m*, jointed to it at *s*. This lever *m* rests in and is held in place by a sliding gage, *n*, the position of which, with relation to the outer end of the feed-lever, governs the extent of movement of the serrated feed-plate *o*, the movement of the feed-lever and the backward and forward reciprocations of the feed-plate being effected by the oscillation of the shuttle-carrier *e*, with which the feed-lever is connected. The feed-lever *m* vibrates on a fulcrum at its point of rest upon the sliding gage *n*. The forward end of the feed-lever is provided with a wedge or incline, $e^2$, (see Fig. 5,) to raise the serrated portion of the feed-plate *o* against the fabric being sewed, as the said feed-plate is to be moved forward, and lets it fall to release the cloth as the feed-plate is moved backward.

The sliding gage *n* can be moved and set at different points to give more or less movement to the outer end or short arm of the feed-lever *m*, to thereby increase or decrease the length of the feed-stroke.

The needle-bar *b* takes its motion from the wheel C by means of an eccentric groove, *p*, Fig. 4, in the upper side of the said wheel, wherein the lower end of the curved lever *a* works, and is carried forward and back in a straight slot in the bed-plate A at the foot of the curved arm B, as shown in Fig. 1.

In the front of the needle-bar is a device for taking up the slack of the needle-thread. The thread passes through two loops or eyelets, *r r*, in its passage down in front of the needle-bar, and also through an eye, *w*, between the loops *r r*, the eye *w* being formed on the end of a short slotted lever *q* hung on a pivot inside the faceplate. The slot of the lever receives a pin on the needle-bar, and the latter, as it moves up and down, actuates the lever *q*, and takes up the slack thread under the needle as the latter begins its descent.

The presser-foot bar is provided with a spiral spring, and regulated by a small hand-lever, *x*, in the usual way.

The working parts are few in number, and simple and strong in their construction, and operate together in perfect unison.

I claim—

1. In a sewing-machine, the combination, with the serrated feed-plate, shuttle-carrier, and mechanism to operate it, of a lever pivoted to the shuttle-carrier and adapted at its other end to raise the said feed-plate to engage its serrated portion with the material being sewed, substantially as described.

2. The serrated feed-plate, shuttle-carrier, and mechanism to operate it, combined with the sliding gage *n* and a lever pivoted to the said carrier, said lever being adapted at its other end to raise the feed-plate, permit it to descend, and move it forward positively, substantially as described.

3. The serrated feed-plate and shuttle-carrier, and feed-lever pivoted to the shuttle-carrier, and provided with a wedge or incline, combined with mechanism to operate the shuttle-carrier and reciprocate the feed-lever in the direction of its length, whereby the said inclined or wedge-shaped end of the feed-lever, moved transversely to and in contact with the lower side of the feed-plate, raises and permits the said plate to fall at the proper times, substantially as described.

4. The driving-wheel C, and the shuttle-carrier *e*, connected therewith by the wrist *d*, in combination with the oscillating shuttle-guide box *g* and the tubular pivot *k*, substantially as and for the purpose described.

5. The combination of the wheel C, the shuttle-carrier *e*, the feed-lever *m*, the sliding gage *n*, and the feed-plate *o*, all arranged and operating substantially as and for the purpose described.

ALLEN SCHENCK.

Witnesses:
A. A. WALTERS,
JAMES P. PAGE.